United States Patent [19]
Mani

[11] Patent Number: 6,063,426
[45] Date of Patent: May 16, 2000

[54] APPARATUS AND METHOD FOR MOISTENING DOUGH MATERIALS

[75] Inventor: Daniel Mani, Los Angeles, Calif.

[73] Assignee: International Baking, Inc., Vernon, Calif.

[21] Appl. No.: 09/120,966

[22] Filed: Jul. 22, 1998

[51] Int. Cl.[7] .................................. A23L 1/00; A21D 6/00
[52] U.S. Cl. ........................ 426/496; 99/443 C; 99/536; 426/506; 426/523
[58] Field of Search ...................................... 426/496, 499, 426/509, 523, 549, 506; 99/404, 406, 443 C, 536

[56] References Cited

U.S. PATENT DOCUMENTS 5,131,835  7/1992  Rini et al. ................................. 426/509

*Primary Examiner*—George C. Yeung
*Attorney, Agent, or Firm*—Blakely Sokoloff Taylor & Zafman LLP

[57] ABSTRACT

A dough moistening apparatus. A reservoir is disposed above a conveyor. The reservoir is operably coupled to a pump that fills the reservoir, from a tank. The reservoir has a spillway such that when overfilled, the fluid cascades onto the conveyor, thereby moistening dough items conveyed thereby.

11 Claims, 3 Drawing Sheets

APPARATUS AND METHOD FOR MOISTENING DOUGH MATERIALS

BACKGROUND OF THE INVENTION (1) Field of the Invention

The invention relates to an apparatus used in the production of baked goods. More specifically, the invention relates to an apparatus for moistening dough materials prior to baking.

(2) Background

In the preparation of certain baked goods such as bagels, the dough is prepared and the individual bagels are formed. The bagels have then traditionally been immersed in hot water prior to baking in an oven. Automated equipment exists to perform this immersion. FIG. 1 shows an example of one such prior art device. A tank of hot water, typically in the range of 180°–190° F. is provided with a pair of substantially parallel conveyor belts displaced relative to one another in a vertical direction. The bagels are carried by the lower conveyor belt down into the tank. The upper conveyor is also beneath the surface of the water in the tank at its low point. Thus, if the bagels float up in the water, they are engaged by the upper conveyor belt moved towards the opposite end of the tank and out again on the lower conveyor belt towards the oven for baking. Particularly at the entry and exit point of the tank, the bagels often interfere with one another, creating a sort of bagel jam, thereby requiring closer supervision of the process. Additionally, the bagels tend to collect a lot of starch from the water, leading to a starchier end product after baking. Furthermore, as the dough is softened by the water, engagement by the top conveyor belt often scars the top of the bagel, leaving an imperfection and resulting in a less visually appealing end product.

In view of the foregoing, it would be desirable to have an automated dough moistening apparatus which do not suffer from the deficiencies discussed above.

BRIEF SUMMARY OF THE INVENTION

A dough moistening apparatus is disclosed. A reservoir is disposed above a conveyor. The reservoir is operably coupled to a pump that fills the reservoir, from a tank. The reservoir has a spillway such that when overfilled, the fluid cascades onto the conveyor, thereby moistening dough items conveyed thereby.

DETAILED DESCRIPTION OF THE INVENTION

Figure 1:
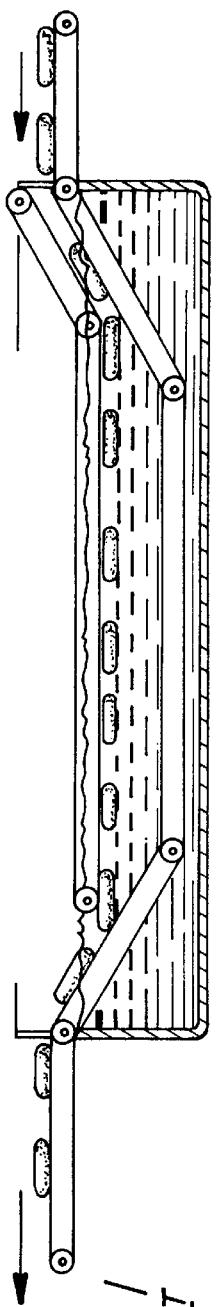
FIG. 1 is a schematic drawing showing a prior art apparatus used in making bagels.
Figure 2:
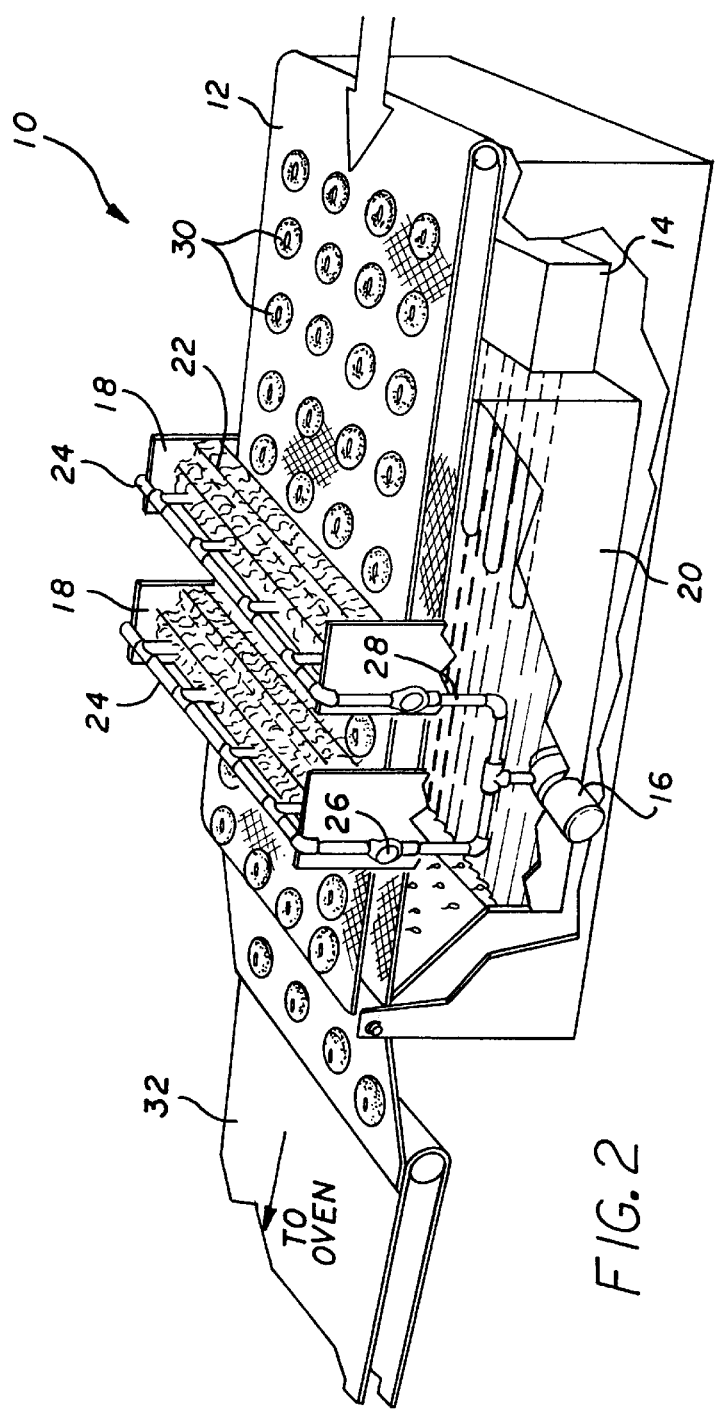
FIG. 2 is a diagram of a cutaway perspective view of one embodiment of the invention.

FIG. 2 is a diagram of a perspective view of one embodiment of the invention. Dough moistening apparatus 10 includes a conveyor 12, suitable for conveying dough items such as bagels 30 over a distance. It is desirable that conveyor 12 be porous to permit easy drainage of water impacting on its surface. A tank 20 disposed below conveyor 12 may be used to contain water to be used in the moistening process. In the event that it is desirable to moisten the dough with hot water, a heat source, such as boiler element 14, may be used to heat the water in tank 20. One or more reservoirs 18 are coupled so as to be suspended over the conveyor 12. Each such reservoir 18 has at least one spillway 22. A pump 16 moves water from tank 20 via piping 28 through pipe 24, having multiple outlet ports to fill reservoir 18. A valve may be provided along pipe 28 to control flow into a reservoir 18. In the embodiment shown in FIG. 2, two reservoirs 18 are provided.

As water flows into reservoir 18, the reservoir 18 is filled and then the water begins to cascade over spillway 22 in a continuous stream. Bagels moving along the conveyor impinge on this stream and are moistened by it. The water then drains back into the tank and may be recirculated. The water running over the bagels tends to wash away some of the starch from them, resulting in a lower starch end product. While the prior art submersion method would dissolve some starch, that starch would frequently reaccumulate on subsequent bagels. Because the starch is less dense than water, by pumping the water from the bottom of the tank, the invented apparatus reduces the reaccumulation of starch on subsequent bagels.

In a preferred embodiment, the water in tank 20 is heated by boiler element 14 so that the cascade moistening the bagels is in a temperature range of 170°–200° F. The hotter end of this range results in a crustier bagel while the lower end results in a doughier bagel. Significantly, because the bagels move down the conveyor unobstructed, the bagels are not subject to floating off as in the prior art, and no bagel jams result. Moreover, since there is no contact between the top surface of the bagel and any conveyor, the top surface remains unscarred. Because the speed of the conveyor belt is expected to be constant, each bagel will be subjected to the hot water stream for the same duration. Ultimately, a shinier, more uniform and commercially attractive bagel results. After being moistened, the bagels can be conveyed into the oven 32 and baked. How the bagels are moved from the conveyor 12 to the oven 32 forms no part of this invention and may be performed in any conventional manner.

Figure 3:
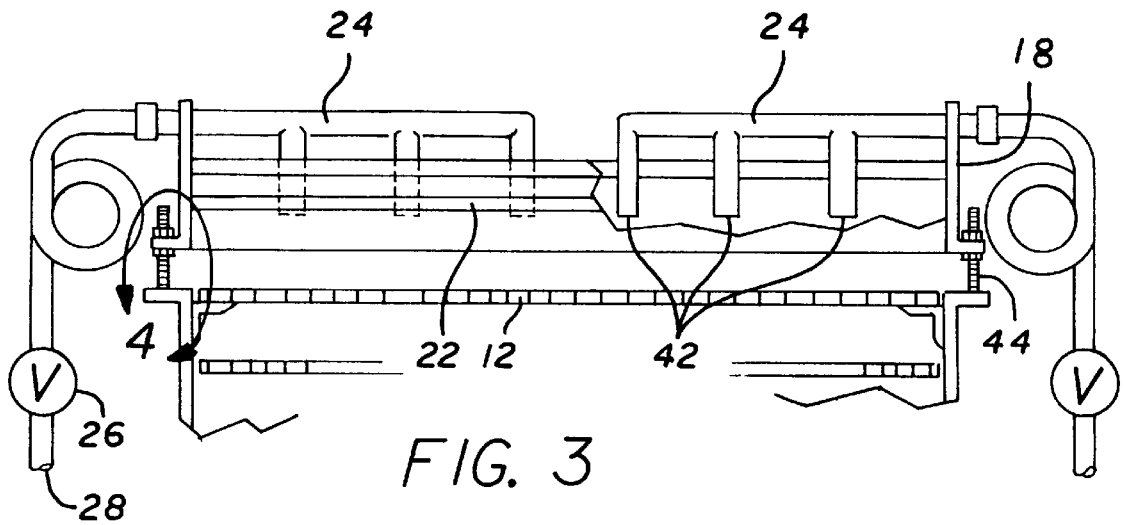
FIG. 3 is a partial sectional view of one embodiment of the invention.

FIG. 3 is a partial sectional view of one embodiment of the invention. Reservoir 18 is retained a distance d above conveyor 12 on support posts 44. Inflow pipes 24 have a plurality of outlet ports 42 through which fluid flows into reservoir 18. Inflow pipes 24 are coupled via valve 26 to pipe 28. Pipe 28 in turn is coupled to a pump (not shown) which sources fluid to the reservoir.

Figure 4:
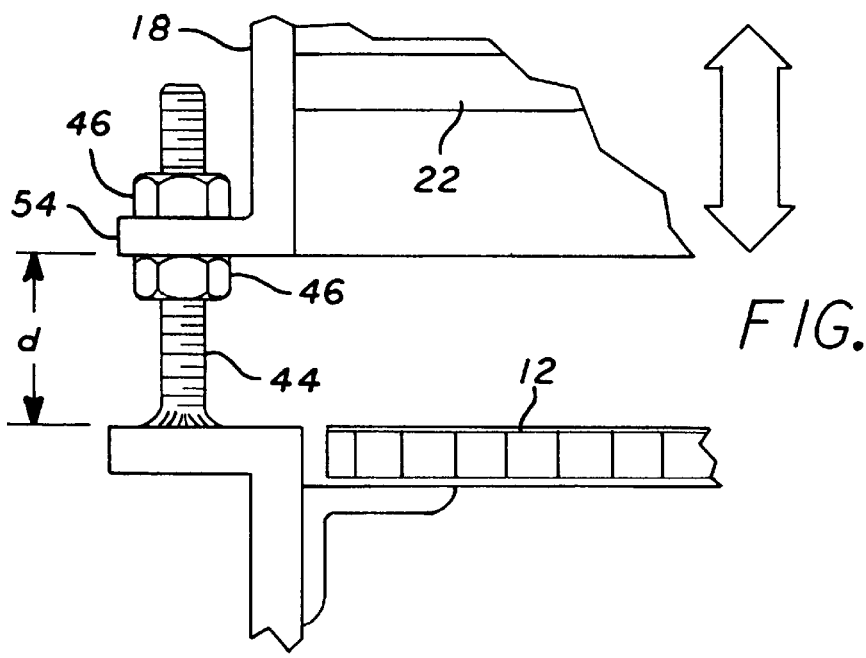
FIG. 4 is a partial cut away view of support post 44 of one embodiment of the invention.

FIG. 4 is a partial cut away view of support post 44 of one embodiment of the invention. Reservoir 18 has an anchor plate 54 extending therefrom. Anchor plate 54 defines a bore hole of a dimension sufficient to permit support post 44 to be inserted therethrough. Support post 44 is deemed to be threaded along a significant portion of its length. A pair of nuts 46 are used to retain the reservoir a distance d from conveyor 12. By adjusting the nuts the distance d can be varied over the threaded distance along the post. The distance d should be maintained at a level sufficient to prevent any interference with the dough items passing along the conveyor belt beneath the reservoir. The distance d may not be uniform over the width of the conveyor. Rather, d should be adjusted to provide for uniform flow over the spillway. For example, if a floor on which the apparatus stands is uneven and if the apparatus is level relative to the conveyor, the whole apparatus tilts at the angle of the floor. This will cause uneven flow over the spillway with greater flow at a low side of the tilt. The tilt may be compensated for by appropriately adjusting the coupling of one end of the reservoir 18 to even the flow over spillway 22. Even flow results in greater consistency of end products. It is also within the scope and contemplation of the invention that the reservoir may be retained above the conveyor in another manner. For example, the reservoir may be suspended from beams above the conveyor, or attached to fixed height pedestals that are adjacent to the conveyor. Other ways to retain the reservoir will occur to one of ordinary skill in the art.

Figure 5:
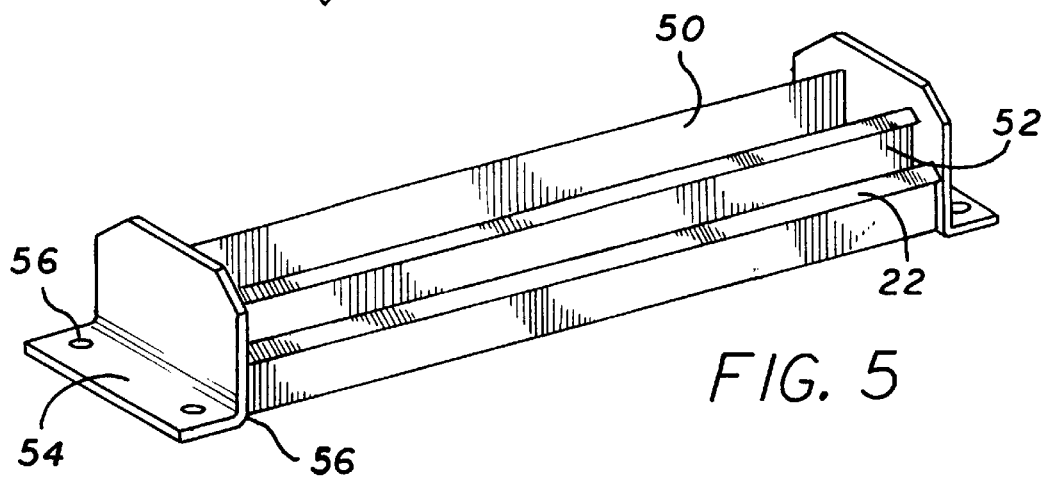
FIG. 5 is a perspective view of a reservoir of one embodiment of the invention.

FIG. 5 shows a perspective view of a reservoir of one embodiment of the invention. The reservoir has a buffer chamber 50 into which water flows from the inflow pipes (not shown) and outer chamber 52 from which water flows over spillway 22. Anchor plate 54 extends from an end of the reservoir and is provided with two bore holes 56 through which mounting posts (not shown) may extend. The reservoir may be constructed of metal or molded plastic. It is desirable that spillway 22 be smooth to increase the uniformity of the fluid flow over the spillway during operation.

Figure 6A:
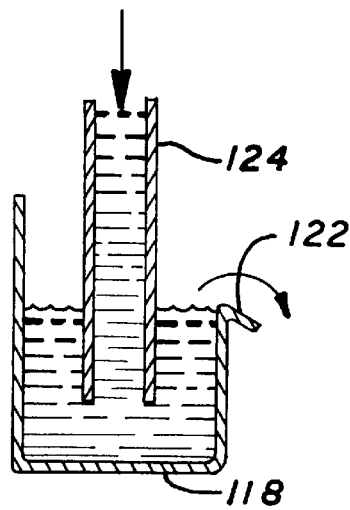
FIGS. 6a–d show cross sectional views of four possible reservoirs of one embodiment of the invention.

FIGS. 6a–d show cross sectional views of four possible reservoirs of one embodiment of the invention. FIG. 6a shows a single chamber reservoir 118 having a single spillway 122. Inflow pipe 124 carries water into the reservoir 118. Reservoir 118 has a rectangular cross sectional area.

Figure 6B:
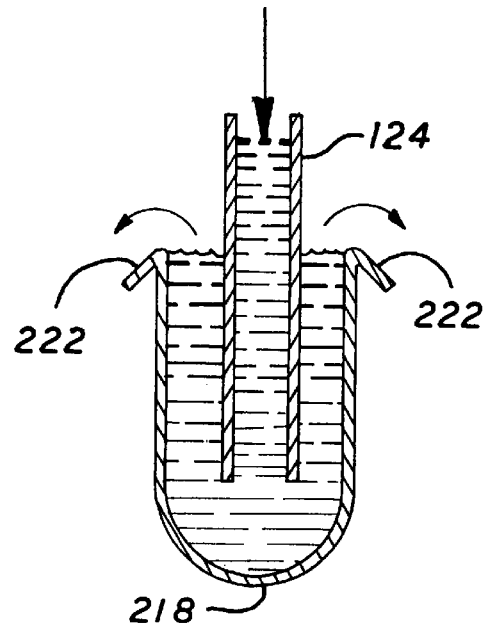

FIG. 6b shows a cross section of the reservoir 218 having two spillways 222. Reservoir 218 has a rounded bottom, thereby having a cross section of an inverted arch. It is deemed within the scope and contemplation of the invention to have a reservoir of any shape, including without limitation, a triangular cross sectional area, a rectangular cross sectional area, or a pentagonal cross sectional area. By providing a pair of spillways 222, the dough items passing underneath are subjected to two cascades of water as they traverse the conveyor. Increased exposure to the heated water increases the thickness of the exterior crusty layer and provides a different consistency of the end product.

Figure 6C:
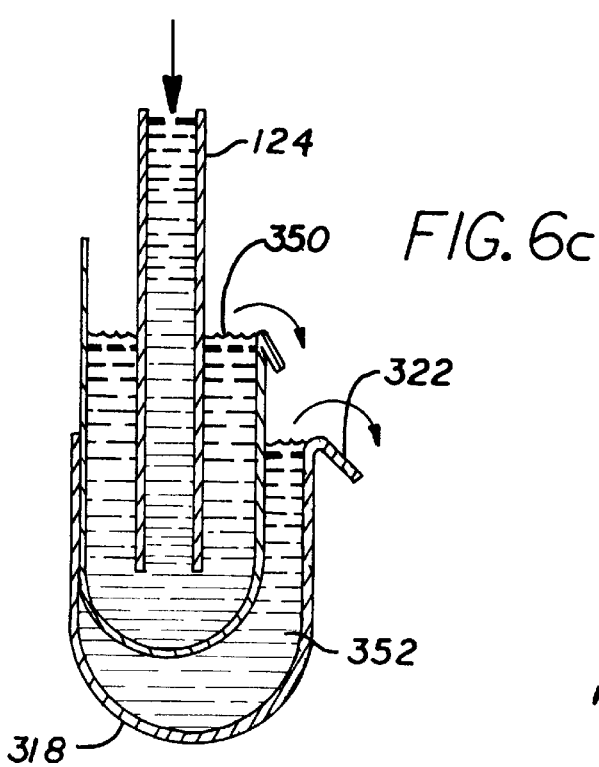

FIG. 6c is a cross section of another alternative embodiment of the reservoir 318, having a buffer chamber 350, an outer chamber 352, and a single spillway 322. Fluid enters the buffer chamber 350, the buffer chamber spills into outer chamber 352, and then off spillway 322. The buffer chamber 350 improves the evenness of flow over the spillway 322 by buffering surges from the outlet port. Consistency of flow over the spillway improves the consistency of the end product passing through the cascade created by the spillway.

Figure 6D:
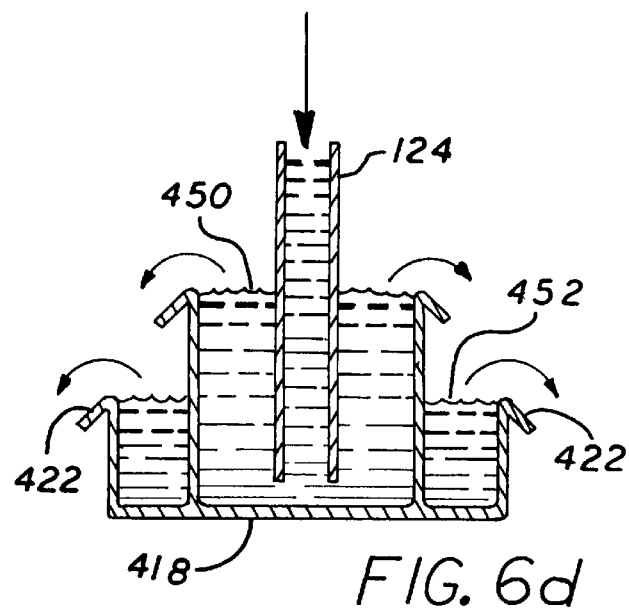

FIG. 6d shows an alternative cross sectional view of a reservoir 418 of one embodiment of the invention. In this embodiment, a buffer chamber 450 is provided fluid from buffer chamber 450 and spills into outer chambers 452 and then off of dual spillways 422.

While FIGS. 6a–6d show four possible cross sectional configurations of a reservoir for the invention, numerous other configurations are also within the scope and contemplation of the invention. By way of example and not limitation, it is also within the scope and contemplation of the invention to provide additional intermediate buffering chambers, where, for example, there would be three chambers before the fluid ultimately spills out of the reservoir onto the conveyor. Additionally, while the outlet port of inflow pipe 124 in each embodiment is shown beneath the surface of the fluid in the reservoir, it is within the scope and contemplation of the invention for fluid to enter the reservoir from a level above the level of the spillway. It is also within the scope and contemplation for fluid to flow in from a side or up from the bottom of the reservoir. As previously mentioned, other cross sectional areas besides those shown are also within the scope and contemplation of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus for moistening materials to be used in manufacturing baked goods comprising:

a conveyor having a top surface on which goods to be baked can be disposed;

a reservoir retained above the top surface of the conveyor, the reservoir having at least a first spillway;

a tank for holding a fluid; and a pump operably coupled between the tank and the reservoir such that when the pump is activated, fluid flows from the tank into the reservoir and over the spillway so that goods on the conveyor are moistened.

2. The apparatus of claim 1 further comprising:

a heat source to heat the fluid in the tank.

3. The apparatus of claim 1 wherein the reservoir comprises:

a buffer chamber; and an outer chamber wherein when fluid overflows the buffer chamber, the fluid ultimately cascades into the outer chamber and then over the spillway.

4. The apparatus of claim 1 further comprising:

a plurality of threaded posts wherein the reservoir is coupled to the threaded post an adjustable distance d above the conveyor.

5. The apparatus of claim 1 wherein the reservoir has the first spillway and a second spillway.

6. The apparatus of claim 5 wherein each spillway substantially spans the conveyor.

7. A dough item moistening and baking method comprising the steps of:

filling a reservoir with a fluid so that the fluid flows over a spillway of the reservoir;

conveying a dough item over a distance so that the dough item impinges on a stream of fluid flowing over the spillway such that the dough item is moistened by the stream; and baking the dough item that has been moistened.

8. The method of claim 7 wherein the fluid is water between 170° and 200° F.

9. The method of claim 7 further comprising the step of:

heating the fluid in a tank.

10. The method of claim 7 further comprising the step of:

recirculating the fluid from a tank disposed under the conveyor to the reservoir.

11. The method of claim 7 wherein the conveying occurs at a constant rate.

* * * * *